S. HUGHES. Improvement in Mosquito-Net Frames.
No. 129,030 Patented July 16, 1872.
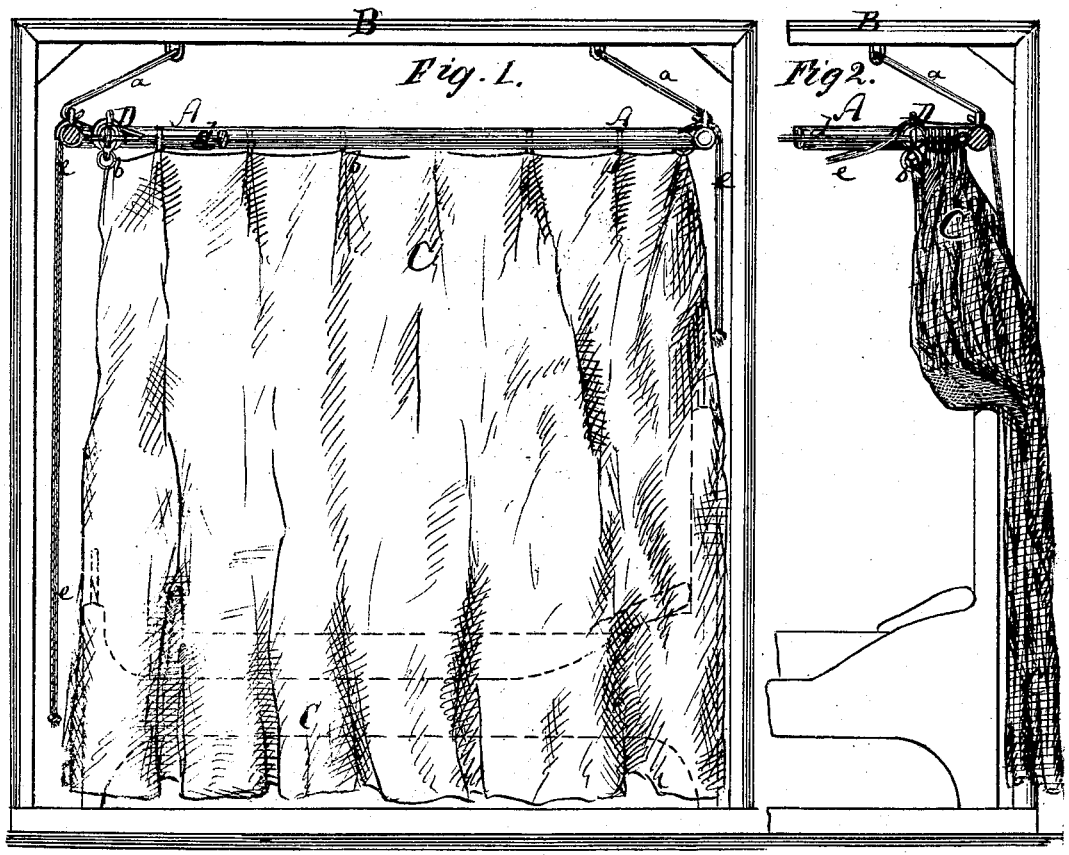
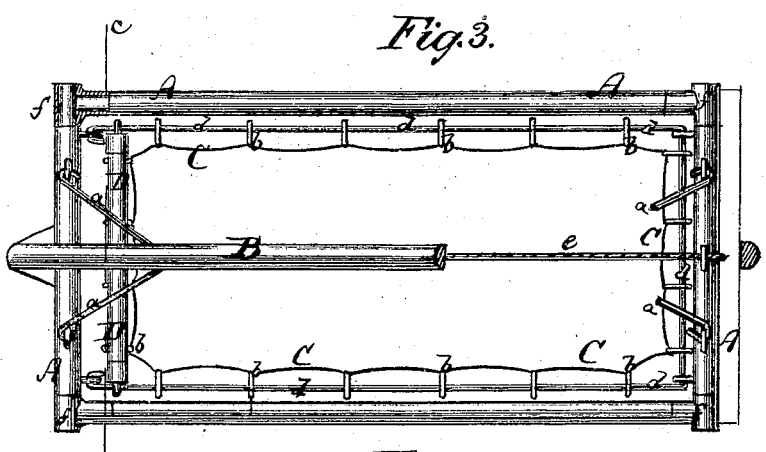
Witnesses:
John Becker
W. A. Graham
Inventor:
S. Hughes
per
[signature]
Attorneys.

UNITED STATES PATENT OFFICE.

SEYMOUR HUGHES, OF JERSEY CITY, NEW JERSEY.

IMPROVEMENT IN MOSQUITO-NET FRAMES.

Specification forming part of Letters Patent No. 129,030, dated July 16, 1872.

Specification describing a new and Improved Mosquito-Net Frame, invented by SEYMOUR HUGHES, of Jersey City, in the county of Hudson and State of New Jersey.

Figure 1 is a side elevation, partly in section, of my improved mosquito-net frame. Fig. 2 is a sectional side view of part of the same, showing the net folded together. Fig. 3 is a top view, partly in section, of the same; and Fig. 4 a vertical transverse section on the line $c$ $c$, Fig. 3.

Similar letters of reference indicate corresponding parts.

This invention relates to a novel apparatus for suspending mosquito-nets over bedsteads and for contracting and expanding the same whenever desired. The invention consists principally in the arrangement of a rectangular frame as large about as the bedstead, and in the application to said frame of a sliding cross-bar, to which the side of the top of the mosquito-net is secured. The remaining three sides of the top of the net are fastened to the rectangular frame and can slide on the sides of the same. The frame is suspended from the ceiling in such manner as to vibrate easily to protect the net in case it is stepped upon and prevent it from being torn.

A in the drawing represents a rectangular frame of wood or other suitable material as large about as the bedstead horizontally. By means of rods $a$ $a$ this frame is suspended from the ceiling B directly above the bedstead in such manner that it can vibrate laterally. C is the mosquito-net large enough to embrace the bedstead and closed on top. The net is, by rings $b$ $b$ or loops, suspended from rails $d$ $d$, which are fastened to the sides and to one end of the frame A, or the net may be directly suspended from the sides and one end of the frame A, the rails $d$ being in that case dispensed with. D is a movable cross-bar held by the side rails $d$ of the frame A or by the sides of said frame direct, but so that it can be moved back and forward by means of cords $e$ $e$, with which it is connected and which extend within reach from the floor. There may be friction-rollers at the ends of the frame A for the cords $e$ to pass over. One end of the top of the net is fastened to the cross-bar D. When this cross-bar is drawn away from that end of the frame A to which the other end of the top of the net is fastened, the net is expanded and covers the bed, as in Fig. 1 or Fig. 3; but when the cross-bar D is drawn toward and against the end of the frame from which one end of the net is suspended, the net will be contracted, as in Fig. 2, and can be folded over one end of the bedstead to allow the making of the bed. In this position, it will be seen, the net is still fully suspended and prevents the entrance of mosquitoes. In the nets as they are usually suspended and made to be elevated during the day the insects often settle during the day-time to torture the occupants of the beds at night; but in my improved net the mosquitoes never get an opportunity of entering, and are therefore completely excluded. By means of the rods $a$ the frame A is suspended from the ceiling, so as to tilt easily, in order to prevent the tearing of the net should any one step upon the same. The ends of the rods or bars which constitute the frame A are, by preference, held in elbow-tubes $f$, as shown in Fig. 3, to be readily taken apart and put away during the winter.

Having thus described my invention, I claim as new and desire to secure by Letters Patent—

1. The sliding cross-bar D, in combination with the rectangular frame A, rails $d$ $d$, and the net C, as shown and described, whereby the said net may be contracted or extended, as set forth.

2. The combination of the frame A with the rods $a$ and cross-bar D, substantially as herein shown and described.

SEYMOUR HUGHES.

Witnesses:
T. B. MOSHER,
W. A. GRAHAM.